(12) United States Patent
Martinez Martinez et al.

(10) Patent No.: US 8,658,122 B2
(45) Date of Patent: Feb. 25, 2014

(54) PROCESS TO PRODUCE SODIUM SULFATE AND MAGNESIUM HYDROXIDE

(75) Inventors: Jesús Manuel Martinez Martinez, Torreón (MX); Armando Garcia López, Torreón (MX); José Gertrudis Bocanegra Rojas, Torreón (MX); Ricardo Benavides Pérez, Torreón (MX)

(73) Assignee: Servicios Administrativas Penoles S.A. de C.V. (MX)

( * ) Notice: Subject to any disclaimer, the term of this patent is extended or adjusted under 35 U.S.C. 154(b) by 0 days.

(21) Appl. No.: 12/599,325

(22) PCT Filed: Dec. 14, 2007

(86) PCT No.: PCT/MX2007/000153
§ 371 (c)(1),
(2), (4) Date: Nov. 9, 2009

(87) PCT Pub. No.: WO2009/078690
PCT Pub. Date: Jun. 25, 2009

(65) Prior Publication Data
US 2010/0254867 A1  Oct. 7, 2010

(51) Int. Cl.
*C01D 5/02* (2006.01)
*C01F 5/14* (2006.01)

(52) U.S. Cl.
USPC ........... 423/544; 423/551; 423/158; 423/164; 423/170; 23/302 T; 23/304

(58) Field of Classification Search
USPC ......... 423/544, 551, 158, 164, 170; 23/302 T, 23/304
See application file for complete search history.

(56) References Cited

U.S. PATENT DOCUMENTS 3,970,528 A * 7/1976 Zirngiebl et al. ............. 205/536
6,214,313 B1 * 4/2001 Berisko et al. ............... 423/638

* cited by examiner

*Primary Examiner* — Timothy Vanoy

(57) ABSTRACT

This invention refers to a novel process to obtain magnesium hydroxide and sodium sulfate from a solid raw material, which contains sodium and magnesium soluble salts, preferably in the form of sulfates, coming from a natural source or as a byproduct of an industrial process. The process consisting in the conditioning of the raw material to guarantee the correct concentrations of sodium and magnesium sulfates that is subjected to a salting-out crystallization when mixed with sodium sulfate obtaining sodium sulfate; the resulting solution is subjected to an alkali treatment to precipitate the magnesium hydroxide and the mother liquor is fed to a regeneration stage of the alkali used in the precipitation of the magnesium hydroxide as well in the sodium sulfate solution for the crystallization. The crystallization can be performed as a multistage process countercurrent to increase the purity of sodium sulfate.

15 Claims, 2 Drawing Sheets

PROCESS TO PRODUCE SODIUM SULFATE AND MAGNESIUM HYDROXIDE

TECHNICAL BACKGROUND OF THE INVENTION

This invention is related with a process to produce sodium sulfate and magnesium hydroxide. Particularly, the invention is related with the precipitation of $Mg^{++}$ as $Mg(OH)_2$ with an alkali, which consumes and regenerates within an internal cycle of the same process; the precipitation of $Na^+$ is carried out by adding a salt more soluble than $Na_2SO_4$ which it precipitates, and also, the said soluble salt is the source of $Na^+$ and $Mg^{++}$ from where the sodium sulfate and magnesium hydroxide is obtained.

BACKGROUND OF THE INVENTION

Sodium sulfate is widely used mainly in detergents, glass and textile industries, and magnesium hydroxide is used to neutralize acid effluents and as flame retardant.

The known production processes to obtain sodium sulfate are by means of the cooling crystallization to produce Galuber's salt or mirabilite from concentrated sodium sulfate solutions; by means of the crystallization by water vaporization of practically pure concentrated sodium sulfate solutions, and by means of precipitation by adding sodium chloride to a saturated solution of sodium sulfate. Another process used is the production of sodium sulfate by the neutralization of effluents, which contain sulfuric acid with soda. Kirk-Othmer, Encyclopedia of Chemical Technology, Third Edition, Vol. 21, pp 245 to 255.

The processes known to produce Magnesium Hydroxide are the precipitation processes by adding an alkali such as soda, potash, aquammonia or lime to a solution which contains Mg++ including seawater, the alkali is lost during the magnesium hydroxide washing and purifying processes. Kirk-Othmer, Encyclopedia of Chemical Technology, Third Edition, Vol. 14, pp 629 to 631.

In U.S. Pat. No. 5,529,764 (Lampert et al, 1996) is shown a process to obtain sodium sulfate precipitation by the difference of solubility, where the raw material must contain potassium salts.

In Patent US2005/0220698 application (Ghosh et al., 2005) is mentioned a process to recover the potassium sulfate from brine and with the precipitation of magnesium hydroxide by adding directly hydrated lime. In this process, the alkali used in the magnesium hydroxide precipitation is not regenerated.

In patent MX150773 (Miramontes, 1984) it is described a process to obtain magnesium hydroxide and potassium sulfate by means of saturation with ammonia and carbon dioxide, having as a disadvantage that two different gas currents are required to precipitate the cations, which makes difficult to control the process currents.

In U.S. Pat. No. 4,693,872 (Nakaya et al., 1987) a process to produce high-purity magnesium hydroxide is disclosed, same that comes from an impure magnesium hydroxide that is solubilized first by a calcium chloride current from the ammonia regeneration, and with the addition of gas carbon dioxide. It has the disadvantage that it requires handling two gas currents, and it only produces magnesium hydroxide.

The foregoing processes are widely known and used in industry, being known that most of them require high-energy consumption (electrical power and fuel); the magnesium hydroxide purity produced is commonly linked with the purity of raw materials.

Objective of the Invention

Considering the alternatives of the process available, an objective of this invention is to provide a new process to obtain sodium sulfate and magnesium hydroxide.

Another objective of the invention is to provide a process to obtain sodium sulfate and magnesium hydroxide from a solid raw material that contains soluble sodium and magnesium salts, whether from a natural source or as a product or byproduct of any process.

This invention has the objective to provide a process in which the control of the purity of both main products can be possible.

Another objective of this invention is to provide a process in which the magnesium hydroxide purity is controlled by means of alkali regeneration and recirculation, without regard to the raw material purity.

Another objective of this invention is also, to provide a process in which the sodium sulfate purity is controlled by means of a crystallization process usually know as salting-out ("the addition of particular electrolytes in an aqueous phase to increase the distribution rate of a particular solute" IUPAC Compendium of Chemical Terminology, Electronic version, http://goldbook.iupac.org/S05450.html)

These and other objectives will be evident under the light of the following description, as well as the figures which are herein enclosed, same that must be considered as illustrative and not limited to the scope of the invention.

BRIEF FIGURES DESCRIPTION

DETAILED DESCRIPTION OF THE INVENTION

Figure 1:
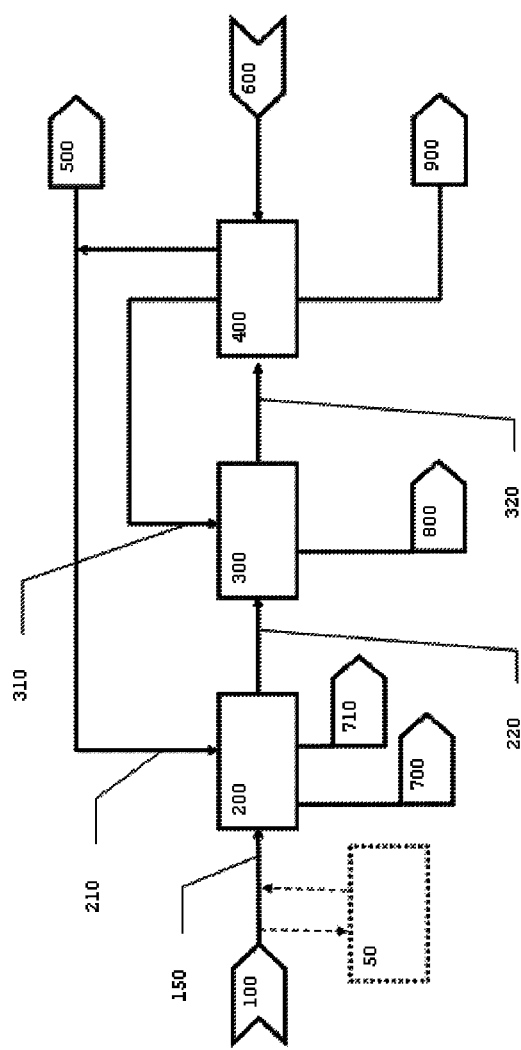
FIG. 1 is a block diagram, which represents the process flow of this invention.

In order to improve the understanding of the following description it is required to read it jointly with FIG. 1, which represents the flow chart of the process by means of a series of blocks.

The process to obtaining Sodium sulfate and magnesium hydroxide of this invention, is initially characterized because the required raw material (100) is a mixture or solid compound which contains soluble sodium or magnesium salts; being some of the preferred materials the natural minerals as Bloedite, Loewite, Vanthoffite, Dansite, Neighborite, Humberstonite and Konyaite, as well as salts like astrakanite, which are products or byproducts of chemical processes.

The raw material (100) is fed to a process commonly known as "Salting-out" (200) which is performed by removing a salt from a solution by the addition of other salt, which is more soluble. In block (200), a current (150) which mainly contains sodium and magnesium soluble salts, as well as their sulfates or other metals, is mixed, being this current (150) the raw material (100) or the product (150) of a pretreatment (50) which will be below described, with a current (210) that is a concentrated sodium sulfate solution.

The dissolution of the current (150) causes the sodium sulfate precipitation, which is separated from the liquor by means of any technique known to deliver a product (700) which is sodium sulfate with insoluble residues of the current (150); being the remaining liquor (220), a solution, which contains sodium and magnesium ions. In order to obtain a sodium sulfate anhydrous it is required that the temperature in the process represented by the block (200) be higher or equal to 32.5° C.

In order to control the sodium sulfate crystal size (700) is necessary to regulate the dissolution time of the material in the current (150), where a faster material dissolution time produces a lower size crystal of the product (700).

The purity of the sodium sulfate current (700) is linked to the presence of insoluble elements in the raw material (100); because of this, a raw material with low impurities content is selected.

If the sodium sulfate obtained with the raw material used (100) does not fulfill the commercial requirements, as a first alternative, the amount of impurities must be reduced in the raw material (100), by means of washing or recrystallization in the pretreatment stage, represented by the block (50) in FIG. 1, according to the nature of the impurities.

In order to guarantee the presence of sodium, magnesium and sulfate ions in the current (150) the pretreatment (50) may include an acid wash, preferably sulfuric acid, in order to make soluble the cations and to add a sulfate source.

Figure 2:
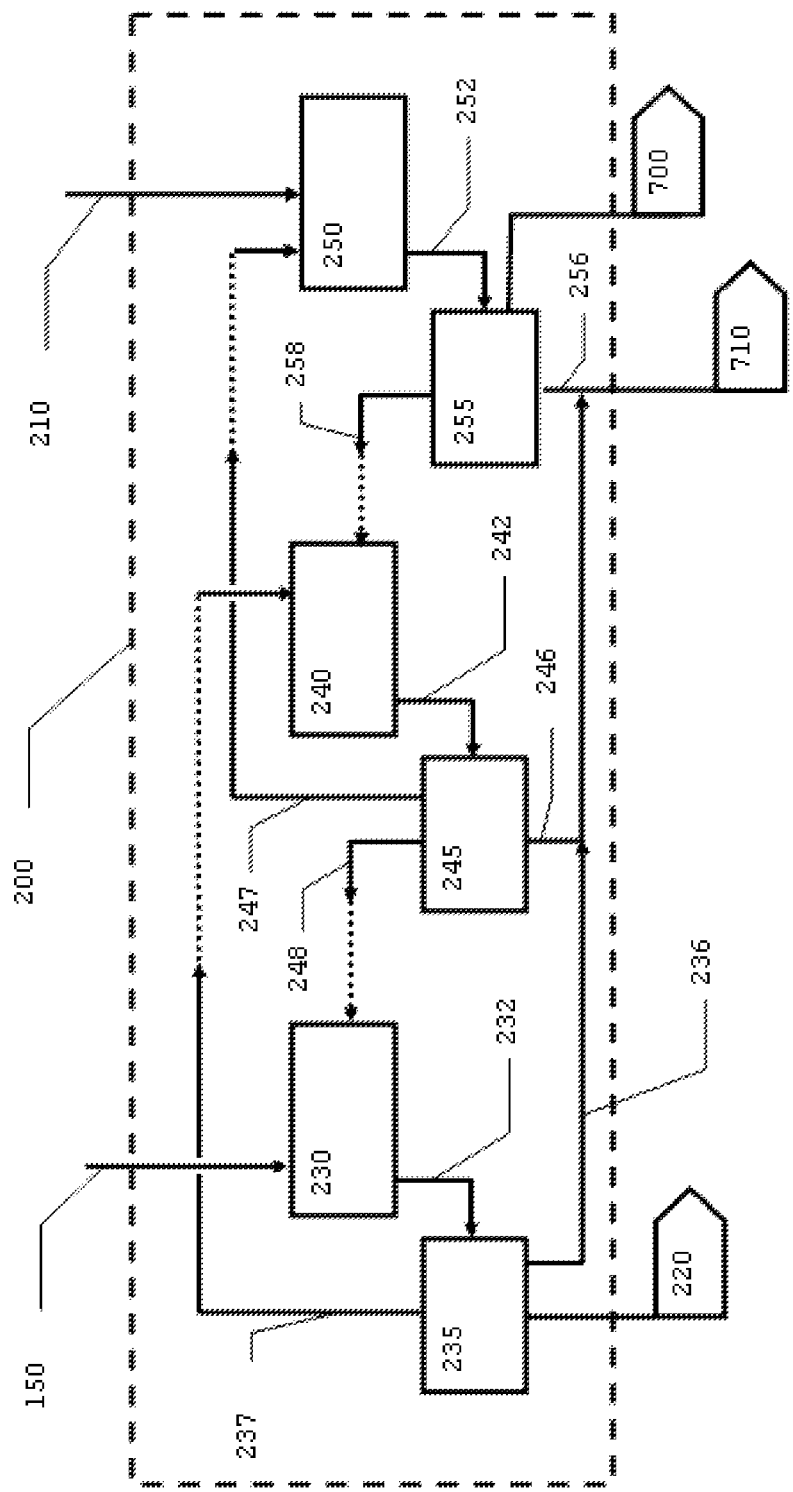
FIG. 2 is a block diagram which represents the salting-out process of block (200) of FIG. 1.

If by means of the mass balance analysis is determined that the sodium sulfate (700) will not fulfill the purity features required by the market for a given feed (150), then the salting-out process (200) will be composed by a series of stages, as many as necessary, as is shown in FIG. 2, to enrich the sodium sulfate in such way that the product (700) reaches the desired purity.

The current (220) obtained in the "salting-out" (200) process is fed to an operation (300) where it reacts with current (310), that is an alkali, preferably, sodium hydroxide or ammonium hydroxide, even though other hydroxides of alkaline metals as potassium hydroxide may be used, provided that the salt obtained by the OH⁻ substitution be soluble, in order to avoid that it will be swept away with the precipitated magnesium hydroxide.

The magnesium hydroxide produced is precipitated and split out from the mother liquor by typical methods, as can be filtration, sedimentation, centrifugation, etc., in order to obtain the product (800), which purity level will depend on the splitting method and the washing stages to which the product (800) has been subjected.

The mother liquor (320) is an aqueous solution of sodium soluble salts and the salt produced by the OH⁻ substitution in the alkali in brought to the last stage (400) also known as "alkali regeneration".

The technique used to alkali regeneration (400) is in terms of the nature of the alkali, as it is shown in the following examples.

Example 1

Use of Sodium Hydroxide as Alkali to Precipitate Magnesium Hydroxide

When the alkali used is sodium hydroxide, regeneration is made by the electrochemical decomposition of the sodium ions solution into sodium hydroxide and the acid corresponding to the anion, in this way, if the raw material (100) is formed by sodium and magnesium sulfates, as the bloedite or loewite, in the mother liquor (320) it will be obtained a sodium sulfate solution, consequently in the alkali (400) regeneration is obtained sulfuric acid which results from the process as a byproduct (900).

Example 2

Use of Potassium Hydroxide as Alkali to Precipitate Magnesium Hydroxide

When potassium hydroxide is used as alkali, regeneration is made by the electrochemical decomposition of sodium and potassium ions solution into sodium and potassium hydroxide and the acid corresponding to the anion.

Although the alkalis mentioned in examples 1 and 2 are very similar, from a chemical point of view, the second one has the disadvantage that it introduces an anion different from the ones contained in raw material (100), therefore, after several regeneration cycles and because of the natural inefficacy of the involved process, whether of reaction or splitting, and because it is swept by the output currents of processes (700), (800) and (710) in the event of draining insolubles in the salting-out, and (500) in the event of draining to balance cations, the potassium will tend to disappear and all the process will end only with a regeneration of sodium hydroxide. This is why it is recommended to use an alkali with a cation common to any of the ones contained in the raw material (100).

In both cases, illustrated by examples 1 and 2, only a fraction of the current (320) is subjected to regeneration, in such way that it allows recovering the alkali used in the block (300), the rest of this current is recycled to the block (200).

Example 3

Use of Ammonium Hydroxide or Ammoniac Gas as Alkali to Precipitate Magnesium

Hydroxide.

An exception to the foregoing recommendation is when ammonium hydroxide is used, with which the regeneration is made by the chemical decomposition of mother liquor (320), that in this case is a solution of sodium and ammonium ions, to produce ammonia and a substitution salt which corresponds to the alkali added to the current (600), which must be stronger than the ammonium hydroxide. In this way, if calcium hydroxide is added to the mother liquor (320), ammonia gas is obtained, which is directly supplied or absorbed in water to the block (300) as the current (310), and precipitated calcium sulfate which comes from the process through the current (900). The liquor, which results of the alkali regeneration, is recycled by means of current (210) to the block (200). When it is required to balance the content of cations within the whole process, a fraction, determined by a mass balance of the process, of the mother liquor which results from the alkali regeneration, block (400), is withdrawn from the process as a byproduct by means of the current (500).

It is not needed to feed the alkali into the current (600) when no electrolytic methods are used in the alkali regeneration (310).

The product (310) of the alkali regeneration (400) is practically a pure regenerated alkali current, and is recycled to block (300).

In its most simple form the salting-out process comprises a stage as represented in FIG. 1 where current 150 mixes with current 210 to cause the crystallization of the sodium sulfate which separates from the mother liquor to originate the currents (700), (710) and (220) as herein described.

In the case when is necessary to increase the purity of the sodium sulfate (700), besides the one achieved by the pretreatment of the raw material (100) in process block (50), the salting-out process is performed in multiple stages countercurrent, as needed to achieve the purity of the sodium sulfate in current (700). FIG. 2 describes in detail the multistage procedure, wherein the current (150) that comprises mainly a sodium source, magnesium and sulfate is treated with current (210) which is a solution abundant in sodium sulfate, as a result of the alkali regeneration in block (400), to produce the sodium sulfate (700) and current (220) which is a solution abundant in sodium and magnesium fed to (300). Blocks (230), (240) and (250) represent the intermediate stages of salting-out, blocks (235), (245) and (255) represent the respective stages of selective separation.

The above-mentioned selective separation, with relation to blocks (235), (245) and (255) is performed by means of conventional separation techniques such as elutriation, fractioned sedimentation, gravimetric separation, or classification of sizes using filters or sieves.

Current (150) is treated in block (230) with current (248), which is a solution abundant in sodium, magnesium and sulfates coming from the selective separation of the next stage (245), to obtain the current (232) that is fed to block (235) where the selective separation in three currents is done: the current (220) which is a sodium, magnesium and sulfates solution that is fed to block (300) in FIG. 1; current (236) with the insolubles that come out of the process through the residual current (710); and current (237) that contains solids abundant in sodium sulfate and that is fed to the salting-out stage of the next stage, block (240).

Current (237) is treated in block (240) with current (258), which is a solution abundant in sodium, magnesium and sulfates coming from the selective separation of the next stage (255) to obtain current (242) which is fed to block (245) where de selective separation in three currents is done: the current (248) which is a sodium, magnesium and sulfates solution that is fed to block (230); current (246) with the insolubles that come out of the process through the residual current (710); and current (247) that contains solids abundant in sodium sulfate and that is fed to the salting-out stage of the next stage, block (250).

Current (247) is treated in block (250) with current (210), which is a solution abundant in sodium, magnesium and sulfates coming from the alkali regeneration stage, block (400) of FIG. 1, to obtain current (252) which is fed to block (255) where de selective separation in three currents is done: the current (258) which is a sodium, magnesium and sulfates solution that is fed to block (240); current (256) with the insolubles that come out of the process through the residual current (710); and current (257) that contains solids abundant in sodium sulfate with the purity required by the process, that exits the process through the current (700).

Blocks (240) and (245) with their respective entrance and exit currents, will repeat as many times as necessary until the result of the mass balance analysis results in a purity of the product (700) commercially acceptable.

Once explained the above description, it will clear to the technician with knowledge in the area, that other salts can be obtained as products instead of the sodium sulfate by modifying the composition of the feed current (150), e.g., to obtain sodium chloride it is needed to feed a source of magnesium, sodium and chlorides, so the acid generated as byproduct (900) of block (400) will be hydrochloric acid. In other example, if the raw material (100) includes sodium carbonates and/or magnesium, the pretreatment (50) will consist in an acid attack to free carbonates, sulfuric or hydrochloric acids can also be used. In general, preferably the anion of the selected acid must be the same as the one of the soluble species.

Once the invention was described, the things considered novel and therefore claimed are the following:

1. A process to obtain sodium sulfate and magnesium hydroxide from a mixture or compound containing salts sodium and magnesium soluble salts consisting in the following stages:
   a. Conditioning the raw material by means of a prior treatment,
   b. Mixing the raw material treated with a solution abundant in sodium sulfate to crystallize the sodium sulfate in the mixture, as final product,
   c. Reacting the crystallization remaining solution of the sodium sulfate in the mixture mentioned in the step b) with an alkali, and precipitate the magnesium hydroxide formed, as final product,
   d. Regenerating the alkali by treating the mother liquor of the above stage, and
   e. Recirculating the alkali regenerated in the stage before stage c) and recirculating the solution abundant in sodium sulfate to stage b).

2. A process to obtain sodium sulfate and magnesium hydroxide according to claim 1, wherein the mixture or compound used as raw material is found in its solid state.

3. A process to obtain sodium sulfate and magnesium hydroxide according to claim 2, wherein the raw material is a natural mineral selected from the group that includes Bloedite, Loewite, Vanthoffite, Dansite, Neighborite, Humberstonite and Konyaite.

4. A process to obtain sodium sulfate and magnesium hydroxide according to claim 2, wherein the raw material is a salt or a mixture of salts that are a product or byproduct of an industrial process, such as astrakanite.

5. A process to obtain sodium sulfate and magnesium hydroxide according to claim 1, wherein the pretreatment adjusts the sodium and magnesium sulfate content in the raw material and the impurities and insolubles content are decreased.

6. A process to obtain sodium sulfate and magnesium hydroxide according to claim 5, wherein the adjustment f sodium and magnesium sulfate is done by means of the substitution of other anions of sulfates.

7. A process to obtain sodium sulfate and magnesium hydroxide according to claim 6, wherein the anions substitution is done by washing with sulfuric acid.

8. A process to obtain sodium sulfate and magnesium hydroxide according to claim 5, wherein the impurities and insolubles reduction is done by washing optionally with a solution saturated of the raw material.

9. A process to obtain sodium sulfate and magnesium hydroxide according to claim 1, wherein the crystallization process is done by salting-out mixing a sodium sulfate solution with the raw material conditioned to produce a sodium sulfate current as final product, a residual current of insoluble material and a current with a sodium and magnesium sulfate solution.

10. A process to obtain sodium sulfate and magnesium hydroxide according to claim 1, wherein crystallization takes place in multiple countercurrent stages.

11. A process to obtain sodium sulfate and magnesium hydroxide according to claim 1, wherein the sodium and magnesium sulfate solution resulting from the salting-out is mixed with an alkali to produce a magnesium hydroxide precipitate as final product and an aqueous solution of sodium soluble salts and the salt formed by the substitution of OH⁻ in the alkali (mother liquor).

12. A process to obtain sodium sulfate and magnesium hydroxide according to claim 1, wherein the mother liquor in the magnesium hydroxide precipitate is subjected to a process to regenerate the alkali that recirculates to precipitate the magnesium hydroxide and the sodium sulfate to be used in the salting-out.

13. A process to obtain sodium sulfate and magnesium hydroxide according to claim 12, wherein when the alkali used in the magnesium hydroxide precipitation is ammonium hydroxide or ammonia the regeneration is performed by adding a stronger alkali such as soda, calcium oxide or hydroxide that releases ammonia gas.

14. A process to obtain sodium sulfate and magnesium hydroxide according to claim 13, wherein the ammonia gas is absorbed in water to form ammonium hydroxide.

15. A process to obtain sodium sulfate and magnesium hydroxide according to claim 12, wherein when the alkali used is an alkali metal hydroxide, the alkali regeneration is performed by electrochemical processes.

\* \* \* \* \*